(12) United States Patent
Okano et al.

(10) Patent No.: US 12,142,080 B2
(45) Date of Patent: Nov. 12, 2024

(54) DATA PROCESSING SYSTEM AND DATA PROCESSING METHOD

(71) Applicant: SEMICONDUCTOR ENERGY LABORATORY CO., LTD., Atsugi (JP)

(72) Inventors: Tatsuya Okano, Kanagawa (JP); Teppei Oguni, Kanagawa (JP); Kengo Akimoto, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 253 days.

(21) Appl. No.: 17/778,623

(22) PCT Filed: Nov. 20, 2020

(86) PCT No.: PCT/IB2020/060947
§ 371 (c)(1),
(2) Date: May 20, 2022

(87) PCT Pub. No.: WO2021/111234
PCT Pub. Date: Jun. 10, 2021

(65) Prior Publication Data
US 2022/0415089 A1 Dec. 29, 2022

(30) Foreign Application Priority Data
Dec. 6, 2019 (JP) .................................. 2019-221620

(51) Int. Cl.
*G06V 10/74* (2022.01)
*G06V 10/762* (2022.01)
(Continued)

(52) U.S. Cl.
CPC ............ *G06V 40/20* (2022.01); *G06V 10/761* (2022.01); *G06V 10/762* (2022.01); *G06V 10/82* (2022.01); *G06V 40/178* (2022.01)

(58) Field of Classification Search
CPC .... G06V 40/20; G06V 40/178; G06V 10/761; G06V 10/82
See application file for complete search history.

(56) References Cited

U.S. PATENT DOCUMENTS

2017/0127992 A1  5/2017  Takahashi
2018/0330178 A1* 11/2018  el Kaliouby ........... G16H 50/20
(Continued)

FOREIGN PATENT DOCUMENTS

JP   2007-129312 A   5/2007
JP   2010-088756 A   4/2010
(Continued)

OTHER PUBLICATIONS

International Search Report (Application No. PCT/IB2020/060947) Dated Feb. 22, 2021.
(Continued)

*Primary Examiner* — Benjamin O Dulaney
(74) *Attorney, Agent, or Firm* — Fish & Richardson P.C.

(57) ABSTRACT

A data processing system that can sense fatigue or the like using a neural network is provided. First, a reference image is obtained on the basis of first to n-th images (n is an integer greater than or equal to 2). Next, the first to n-th images and the reference image are input to an input layer of a neural network, first to n-th estimated ages and a reference estimated age are output from an output layer, and first to n-th data and reference data are output from an intermediate layer. After that, first to n-th coordinates are obtained in each of which an x-coordinate is a value corresponding to a difference between the reference estimated age and the first to n-th estimated ages and a y-coordinate is a value corresponding to the degree of similarity between the reference data and the first to n-th data. Next, a query image is input to the input layer, a query estimated age is output from the output layer, query data is output from the intermediate (Continued)

layer, and query coordinates are obtained using the output results. Whether a person of a face included in the query image feels fatigue or the like is determined on the basis of the first to n-th coordinates and the query coordinates.

3 Claims, 10 Drawing Sheets

(51) Int. Cl.
    *G06V 10/82*     (2022.01)
    *G06V 40/16*     (2022.01)
    *G06V 40/20*     (2022.01)

(56) References Cited

U.S. PATENT DOCUMENTS

| | | | | |
|---|---|---|---|---|
| 2019/0147156 | A1* | 5/2019 | Burri | G06V 40/174 |
| | | | | 713/186 |
| 2020/0285842 | A1* | 9/2020 | Wang | G06F 18/214 |
| 2021/0049349 | A1* | 2/2021 | Farokhi | G06V 20/10 |

FOREIGN PATENT DOCUMENTS

| | | | |
|---|---|---|---|
| JP | 2016-093313 A | 5/2016 | |
| JP | 2017-086524 A | 5/2017 | |

OTHER PUBLICATIONS

Written Opinion (Application No. PCT/IB2020/060947) Dated Feb. 22, 2021.

\* cited by examiner

S01

S02

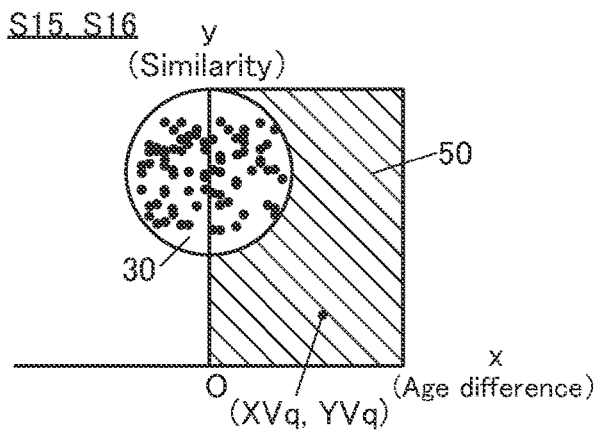
FIG. 9A
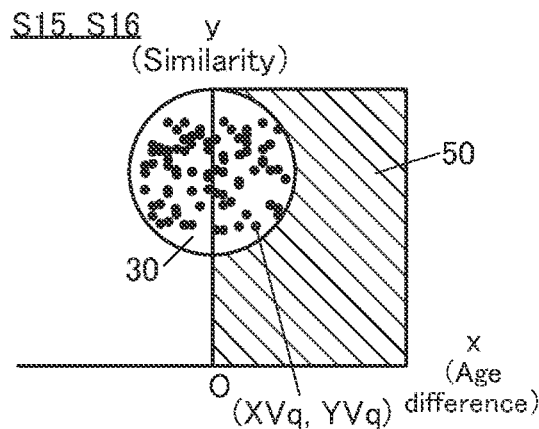
FIG. 9B
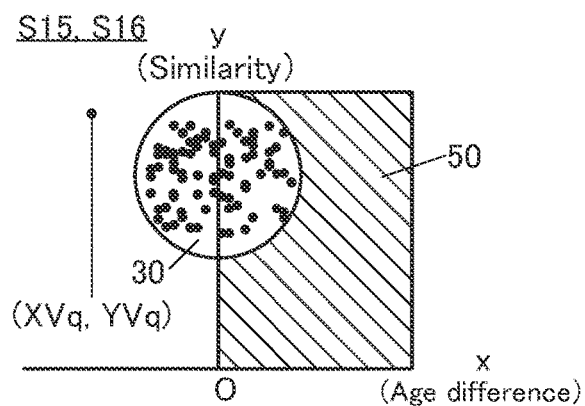
FIG. 9C
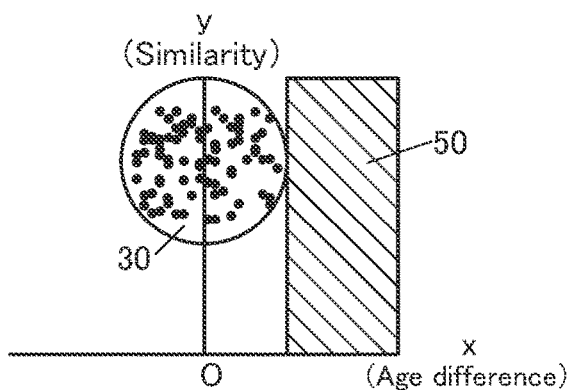
FIG. 9D1
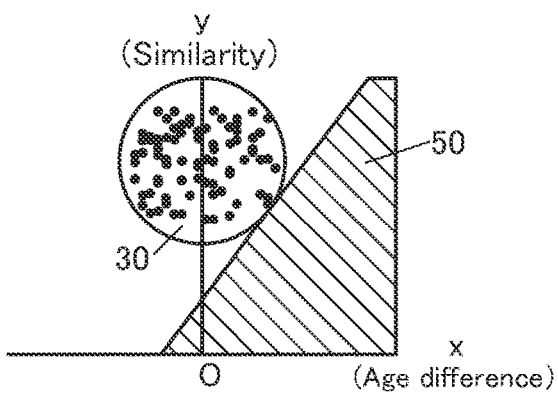
FIG. 9D2

DATA PROCESSING SYSTEM AND DATA PROCESSING METHOD

CROSS REFERENCE TO RELATED APPLICATIONS

This application is a U.S. National Phase Application under 35 U.S.C. § 371 of International Application PCT/IB2020/060947, filed on Nov. 20, 2020, which is incorporated by reference and claims the benefit of a foreign priority application filed in Japan on Dec. 6, 2019, as Application No. 2019-221620.

TECHNICAL FIELD

One embodiment of the present invention relates to a data processing system. Another embodiment of the present invention relates to a data processing method.

BACKGROUND ART

A portable information terminal that has a function of sensing fatigue and stress of a user has been developed. For example, Patent Document 1 discloses a portable information terminal that senses fatigue of a user on the basis of the user's pulse.

REFERENCE

Patent Document

[Patent Document 1] Japanese Published Patent Application No. 2017-86524

SUMMARY OF THE INVENTION

Problems to be Solved by the Invention

For example, in the case where fatigue of a user of an electronic device such as a portable information terminal is sensed on the basis of the user's pulse, the electronic device needs to be attached to the user for a predetermined time. Therefore, as compared to the case where fatigue or the like is sensed without attachment to a user, there is a problem of low convenience.

An object of one embodiment of the present invention is to provide a highly convenient data processing system. Another object is to provide a data processing system that can sense fatigue, stress, or the like in a short time. Another object is to provide a data processing system that can sense fatigue, stress, or the like with the use of a neural network. Another object is to provide a data processing system that can sense fatigue, stress, or the like with high accuracy. Another object is to provide a data processing system that can sense fatigue, stress, or the like by a simple method.

Another object is to provide a highly convenient data processing method. Another object is to provide a data processing method that can sense fatigue, stress, or the like in a short time. Another object is to provide a data processing method that can sense fatigue, stress, or the like with the use of a neural network. Another object is to provide a data processing method that can sense fatigue, stress, or the like with high accuracy. Another object is to provide a data processing method that can sense fatigue, stress, or the like by a simple method.

Note that the description of a plurality of objects does not preclude the existence of each object. One embodiment of the present invention does not necessarily achieve all the objects described as examples. Furthermore, objects other than those listed are apparent from description of this specification, and such objects can be objects of one embodiment of the present invention.

Means for Solving the Problems

One embodiment of the present invention is a data processing system and a data processing method, in which a query image including an image of a person's face and whether the person feels fatigue is determined on the basis of the query image. That is, first to n-th images (n is an integer greater than or equal to 2) including images of a face are obtained, they are input to a neural network, and first to n-th estimated ages output from an output layer and first to n-th data output from an intermediate layer are obtained. In addition, a query image including an image of the face is obtained and input to the neural network, and a query estimated age output from the output layer and query data output from the intermediate layer are obtained. Then, the query estimated age is compared with the first to n-th estimated ages and the query data is compared with the first to n-th data, whereby whether the person included in the query image feels fatigue can be determined.

Specifically, one embodiment of the present invention is a data processing system including an imaging portion, a first processing portion, a second processing portion, a third processing portion, and a fourth processing portion. The imaging portion has a function of obtaining first to n-th images (n is an integer greater than or equal to 2) including images of a person's face, and a query image including an image of the person's face. The first processing portion has a function of obtaining a reference image on the basis of the first to n-th images. The second processing portion has a function of performing processing by a neural network including an input layer, an intermediate layer, and an output layer. The second processing portion has a function of outputting first to n-th estimated ages or a reference estimated age from the output layer and outputting first to n-th data or reference data from the intermediate layer in the case where the first to n-th images or the reference image is input to the input layer. The second processing portion has a function of outputting a query estimated age from the output layer and outputting query data from the intermediate layer in the case where the query image is input to the input layer. The third processing portion has a function of obtaining first to n-th coordinates in each of which an x-coordinate is a value of a difference between the reference estimated age and the first to n-th estimated ages and a y-coordinate is a value of a degree of similarity between the reference data and the first to n-th data. The third processing portion has a function of obtaining query coordinates in which an x-coordinate is a value of a difference between the query estimated age and the reference estimated age and a y-coordinate is a value of a degree of similarity between the query data and the reference data. The fourth processing portion has a function of performing clustering on the basis of the first to n-th coordinates and determining whether the person included in the query image feels fatigue on the basis of a result of the clustering and the query coordinates.

Another embodiment of the present invention is a data processing method, including the steps of obtaining first to n-th images (n is an integer greater than or equal to 2) including images of a person's face; obtaining a reference image on the basis of the first to n-th images; inputting the first to n-th images and the reference image to an input layer of a neural network including the input layer, an intermediate layer, and an output layer to output first to n-th estimated ages and a reference estimated age from the output layer and first to n-th data and reference data from the intermediate layer; obtaining first to n-th coordinates in each of which an x-coordinate is a difference between the reference estimated age and the first to n-th estimated ages and a y-coordinate is a value of a degree of similarity between the reference data and the first to n-th data; obtaining a query image including an image of the person's face; inputting the query image to the input layer to output a query estimated age from the output layer and query data from the intermediate layer; obtaining query coordinates in which an x-coordinate is a value of a difference between the query estimated age and the reference estimated age and a y-coordinate is a value of a degree of similarity between the query data and the reference data; and performing clustering on the basis of the first to n-th coordinates and determining whether the person included in the query image feels fatigue on the basis of a result of the clustering and the query coordinates.

Effect of the Invention

According to one embodiment of the present invention, a highly convenient data processing system can be provided. Alternatively, a data processing system that can sense fatigue, stress, or the like in a short time can be provided. Alternatively, a data processing system that can sense fatigue, stress, or the like with the use of a neural network can be provided. Alternatively, a data processing system that can sense fatigue, stress, or the like with high accuracy can be provided. Alternatively, a data processing system that can sense fatigue, stress, or the like by a simple method can be provided.

Alternatively, a highly convenient data processing method can be provided. Alternatively, a data processing method that can sense fatigue, stress, or the like in a short time can be provided. Alternatively, a data processing method that can sense fatigue, stress, or the like with the use of a neural network can be provided. Alternatively, a data processing method that can sense fatigue, stress, or the like with high accuracy can be provided. Alternatively, a data processing method that can sense fatigue, stress, or the like by a simple method can be provided.

Note that description of the plurality of effects does not preclude the existence of other effects. One embodiment of the present invention does not necessarily achieve all the effects described as examples. In one embodiment of the present invention, other objects, effects, and novel features will be apparent from the description of this specification and the drawings.

BRIEF DESCRIPTION OF THE DRAWINGS

FIG. 9A to FIG. 9C, FIG. 9D1, and FIG. 9D2 are graphs showing examples of a data processing method.

MODE FOR CARRYING OUT THE INVENTION

Figure 1:
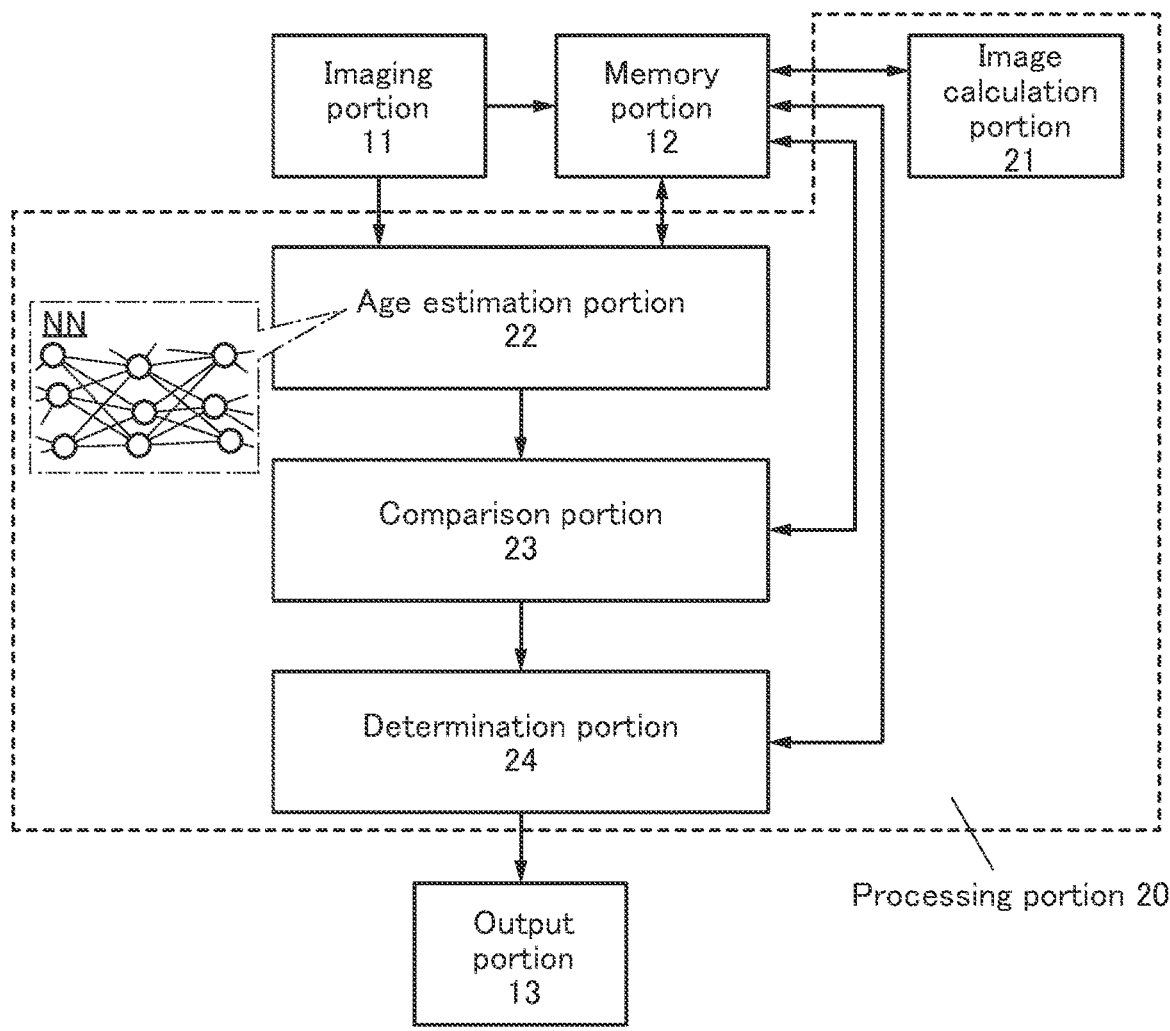
FIG. 1 is a block diagram illustrating a structure example of a data processing system.

Embodiments of the present invention will be described below. Note that one embodiment of the present invention is not limited to the following description, and it will be readily appreciated by those skilled in the art that modes and details of the present invention can be modified in various ways without departing from the spirit and scope of the present invention. One embodiment of the present invention therefore should not be construed as being limited to the following description of the embodiments.

Note that in the drawings attached to this specification, the block diagram in which components are classified according to their functions and shown as independent blocks is illustrated; however, it is difficult to separate actual components completely according to their functions, and one component may be related to a plurality of functions or a plurality of components may achieve one function.

Embodiment 1

In this embodiment, a data processing system of one embodiment of the present invention and a data processing method using the data processing system will be described. With the data processing system of one embodiment of the present invention and the data processing method, whether a user of a portable information terminal such as a smartphone or a tablet feels fatigue, stress, or the like can be determined, for example. Specifically, whether the user feels fatigue, stress, or the like can be determined using a neural network that has a function of estimating an age.

<Structure Example of Data Processing System>

FIG. 1 is a block diagram illustrating a structure example of a data processing system 10 that is the data processing system of one embodiment of the present invention. The data processing system 10 can be incorporated into an electronic device. For example, the data processing system 10 can be incorporated into a portable information terminal such as a smartphone or a tablet.

The data processing system 10 includes an imaging portion 11, a memory portion 12, a processing portion 20, and an output portion 13. The processing portion 20 includes an image calculation portion 21, an age estimation portion 22, a comparison portion 23, and a determination portion 24.

In this specification and the like, the image calculation portion 21, the age estimation portion 22, the comparison portion 23, and the determination portion 24, which are components of the processing portion 20, are also each referred to as a processing portion in some cases. For example, the image calculation portion 21 may be referred to as a first processing portion, the age estimation portion 22 may be referred to as a second processing portion, the comparison portion 23 may be referred to as a third processing portion, and the determination portion 24 may be referred to as a fourth processing portion.

In FIG. 1, exchange of data or the like between the components of the data processing system 10 is shown by arrows. Note that the data exchange shown in FIG. 1 is an example, and data or the like can be sometimes exchanged between components that are not connected by an arrow, for example. Furthermore, data is not exchanged between components that are connected by an arrow in some cases.

The imaging portion 11 has a function of obtaining an image. For example, pixels including photoelectric conversion elements are arranged in matrix in the imaging portion 11, and an image can be obtained by performing imaging using the pixels. The image obtained by the imaging portion 11 can be an image including a person, for example, an image including a user of an electronic device incorporating the data processing system 10. Specifically, the image obtained by the imaging portion 11 can be, for example, an image including a face, such as an image including a face of a user of the electronic device incorporating the data processing system 10.

In this specification and the like, a user of the electronic device incorporating the data processing system is referred to as a user of the data processing system in some cases. For example, a user of the electronic device incorporating the data processing system 10 is referred to as a user of the data processing system 10 in some cases.

The memory portion 12 has a function of storing an image obtained by the imaging portion 11. An image stored in the memory portion 12 can be output to the processing portion 20 as necessary. An image stored in the memory portion 12 can be output to the image calculation portion 21, the age estimation portion 22, or the like, for example.

Furthermore, the memory portion 12 has a function of storing data to be output from the processing portion 20, for example. For example, the processing portion 20 reads out an image stored in the memory portion 12 and performs processing on the read image, and the memory portion 12 has a function of storing data or the like that the processing portion 20 obtains through the processing.

The memory portion 12 can include a DRAM (Dynamic Random Access Memory), an SRAM (Static Random Access Memory), or the like, for example. For example, the memory portion 12 can include a nonvolatile memory such as a flash memory, an ReRAM (Resistive Random Access Memory, also referred to as a resistance-change memory), a PRAM (Phase change Random Access Memory), an FeRAM (Ferroelectric Random Access Memory), or an MRAM (Magnetoresistive Random Access Memory, also referred to as a magneto-resistive memory). Furthermore, the memory portion 12 may include an HDD (Hard Disk Drive), an SSD (Solid State Drive), or the like, for example.

The image calculation portion 21 has a function of obtaining a new image on the basis of a plurality of images. For example, the image calculation portion 21 has a function of obtaining an average image of a plurality of images. For example, in the case where a plurality of images including faces are stored in the memory portion 12, first, the image calculation portion 21 extracts the faces from the plurality of images. An image of the extracted face is referred to as a face image. Next, after the definitions of the face images are adjusted, an average image of the face images is obtained. The image obtained by the image calculation portion 21 is stored in the memory portion 12.

In this specification and the like, an image obtained by the image calculation portion 21 is referred to as a reference image. Furthermore, an average image of face images is referred to as an average face image in some cases. As described above, the image calculation portion 21 has a function of obtaining an average face image, for example. Thus, the reference image can be an average face image, for example.

The age estimation portion 22 has a function of performing processing by a neural network NN. Specifically, the age estimation portion 22 has a function of performing processing by the neural network NN on an image input to the age estimation portion 22. A processing result is output to the comparison portion 23. Alternatively, the processing result is stored in the memory portion 12.

The neural network NN has a function of estimating the age of a person when an image including the person is input. For example, the neural network NN has a function of estimating the age on the basis of the feature value of a face when an image including the face is input. For example, the age can be estimated on the basis of wrinkles, skin sagging, blemishes, nasolabial folds, and the like. For example, the age can be estimated on the basis of wrinkles around one's mouth or at the corners of one's eyes, and the like.

Figure 2A:
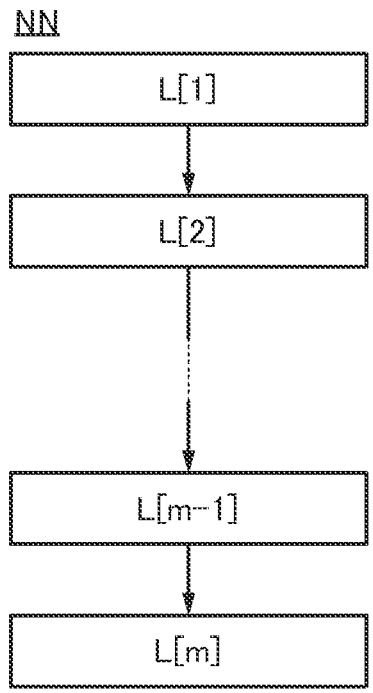
FIG. 2A and FIG. 2B are schematic diagrams showing structure examples of a neural network.

FIG. 2A is a diagram illustrating a structure example of the neural network NN. The neural network NN includes a layer L[1] to a layer L[m] (m is an integer greater than or equal to 2).

The layer L[1] to the layer L[m] include neurons and the neurons provided in the layers are connected to each other. For example, the neuron provided in the layer L[1] is connected to the neuron provided in the layer L[2]. The neuron provided in the layer L[2] is connected to the neuron provided in the layer L[1] and the neuron provided in the layer L[3]. That is, the layer L[1] to the layer L[m] form a hierarchical neural network.

An image is input to the layer L[1], and the layer L[1] outputs data corresponding to the input image. The data is input to the layer L[2], and the layer L[2] outputs data corresponding to the input data. Data output from the layer L[m−1] is input to the layer L[m], and the layer L[m] outputs data corresponding to the input data. In this manner, the layer L[1] can be an input layer, the layer L[2] to the layer L[m−1] can be intermediate layers, and the layer L[m] can be an output layer.

The neural network NN performs learning in advance such that, for example, data output from the layer L[1] to the layer L[m] corresponds to the feature of an image input to the neural network NN. Learning can be performed by unsupervised leaning, supervised learning, or the like. When learning is performed by either unsupervised leaning or supervised learning, a backpropagation method or the like can be used as a learning algorithm.

Figure 2B:
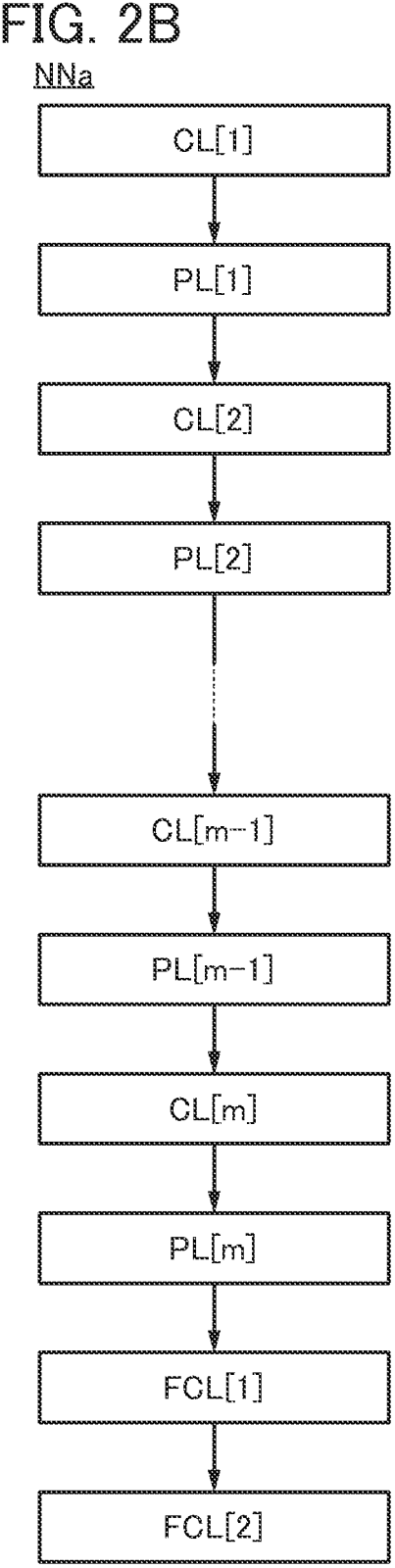

The neural network NN can be a convolutional neural network (CNN). FIG. 2B is a diagram showing a structure example of the neural network NN in the case where a CNN is used as the neural network NN. Here, the neural network NN using a CNN is referred to as a neural network NNa.

The neural network NNa includes a convolutional layer CL, a pooling layer PL, and a fully connected layer FCL. FIG. 2B shows an example in which the neural network NNa includes m convolutional layers CL, m pooling layers PL (m is an integer greater than or equal to 1), and two fully connected layers FCL. Note that the neural network NNa may include only one fully connected layer FCL or three or more fully connected layers FCL.

The convolutional layer CL has a function of performing convolution on data input to the convolutional layer CL. A convolutional layer CL[1] has a function of performing convolution on an image input to the age estimation portion 22, for example. A convolutional layer CL[2] has a function of performing convolution on data output from a pooling layer PL[1]. A convolutional layer CL[m] has a function of performing convolution on data output from a pooling layer PL[m−1].

Convolution is performed by repetition of product-sum operation of the data input to the convolutional layer CL and a weight filter. By the convolution in the convolutional layer CL, a feature or the like of an image corresponding to the image input to the neural network NNa is extracted.

The data subjected to the convolution is converted using an activation function, and then output to the pooling layer PL. As the activation function, ReLU (Rectified Linear Units) or the like can be used. A ReLU is a function that outputs "0" when an input value is negative and outputs the input value as it is when the input value is greater than or equal to "0". As the activation function, a sigmoid function, a tanh function, or the like can be used as well.

The pooling layer PL has a function of performing pooling on the data input from the convolutional layer CL. Pooling is processing in which the data is partitioned into a plurality of regions, and predetermined data is extracted from each of the regions and arranged in a matrix. By the pooling, the size of the data can be reduced while the features extracted by the convolutional layer CL remain. Robustness for a minute difference of the input data can be increased. Note that as the pooling, max pooling, average pooling, Lp pooling, or the like can be used.

The fully connected layer FCL has a function of connecting input data, converting the connected data by an activation function, and outputting the converted data. As the activation function, a ReLU, a sigmoid function, a tanh function, or the like can be used. The fully connected layer FCL has a structure in which all nodes in one layer are connected to all nodes in the next layer. The data output from the convolutional layer CL or the pooling layer PL is a two-dimensional feature map and is unfolded into a one-dimensional feature map when input to the fully connected layer FCL. Then, a vector obtained as a result of the inference by the fully connected layer FCL is output from the fully connected layer FCL.

In the neural network NNa, one of the fully connected layers FCL can be the output layer. For example, in the neural network NNa shown in FIG. 2B, the fully connected layer FCL[2] can be the output layer. Here, in the neural network NNa shown in FIG. 2B, the fully connected layer FCL[1] can be the intermediate layer. In the case where the neural network NNa includes only the fully connected layer FCL[1] as the fully connected layer FCL, the fully connected layer FCL[1] can be the output layer. Furthermore, in the case where the neural network NNa includes the fully connected layer FCL[1] to a fully connected layer FCL[3], the fully connected layer FCL[3] can be the output layer and the fully connected layer FCL[1] and the fully connected layer FCL[2] can be the intermediate layers. Likewise, in the case where the neural network NNa includes four or more fully connected layers FCL, one of the fully connected layers FCL can be the output layer and the rest of the fully connected layers FCL can be the intermediate layers.

Note that the structure of the neural network NNa is not limited to the structure in FIG. 2B. For example, the pooling layer PL may be provided for a plurality of convolutional layers CL. In other words, the number of pooling layers PL included in the neural network NNa may be smaller than the number of convolutional layers CL. In the case where the positional information of the extracted feature is desired to be left as much as possible, the pooling layer PL may be omitted.

Owing to the learning in the neural network NNa, the filter value of the weight filter, the weight coefficient of the fully connected layer FCL, or the like can be optimized.

When an image including a person is input to the input layer of the neural network NN, the estimated age of the person is output from the output layer of the neural network NN. For example, in the case where the neural network NN has the structure shown in FIG. 2A, an image including a person is input to the layer L[1] that is the input layer, and then the estimated age of the person is output from the layer L[m] that is the output layer. In the case where the neural network NN is the neural network NNa having the structure shown in FIG. 2B, an image including a person is input to the convolutional layer CL[1] that is the input layer, and then the estimated age of the person is output from the fully connected layer FCL[2] that is the output layer.

The comparison portion 23 has a function of comparing data output from the output layer of the neural network NN. For example, the comparison portion 23 has a function of comparing the estimated ages output from the output layer of the neural network NN. Specifically, for example, the comparison portion 23 has a function of comparing the estimated age of a person included in an image obtained by the imaging portion 11 with the estimated age obtained by inputting a reference image to the neural network NN. For example, comparison can be performed by calculating a difference between the estimated age of a person included in an image obtained by the imaging portion 11 and the estimated age obtained by inputting a reference image to the neural network NN.

The comparison portion 23 has a function of comparing data output from the intermediated layer of the neural network NN. For example, in the case where the neural network NN has the structure shown in FIG. 2A, the comparison portion 23 has a function of comparing data output from the layer L[m−1]. Specifically, the comparison portion 23 has a function of comparing data output from the layer L[m−1] when an image obtained by the imaging portion 11 is input to the neural network NN with data output from the layer L[m−1] when a reference image is input to the neural network NN, for example. In the case where the neural network NN is the neural network NNa having the structure shown in FIG. 2B, the comparison portion 23 has a function of comparing data output from the fully connected layer FCL[1], for example. Alternatively, the comparison portion 23 has a function of comparing data output from a pooling layer PL[m]. Comparison of data output from the intermediate layer of the neural network NN can be performed by calculating the degree of similarity, for example. For example, the degree of similarity can be calculated by using cosine similarity, covariance, unbiased covariance, Pearson's correlation coefficient, or the like. In particular, cosine similarity is preferably used.

Furthermore, the comparison portion 23 has a function of obtaining coordinates on the basis of the comparison result. For example, the comparison portion 23 has a function of obtaining coordinates in which an x-coordinate is the comparison result of the estimated age output from the output layer of the neural network NN and a y-coordinate is the comparison result of the data output from the intermediated layer of the neural network NN.

Note that output data of two or more of the intermediate layers of the neural network NN may be compared. For example, in the case where the neural network NN has the structure shown in FIG. 2A, the comparison portion 23 has a function of comparing data output from the layer L[m−1] and data output from the layer L[m−2]. Specifically, the comparison portion 23 has a function of comparing data from the layer L[m−1] and data from the layer L[m−2] that are output when an image obtained by the imaging portion 11 is input to the neural network NN with data from the layer L[m−1] and data from the layer [m−2] that are output when a reference image is input to the neural network NN, for example. In the case where the neural network NN is the neural network NNa having the structure shown in FIG. 2B, the comparison portion 23 has a function of comparing data output from the fully connected layer FCL[1] and data output from the pooling layer PL[m], for example. Specifically, the comparison portion 23 has a function of comparing data from the fully connected layer FCL[1] and data from the pooling layer PL[m] that are output when an image obtained by the imaging portion 11 is input to the neural network NNa with data from the fully connected layer FCL[1] and data from the pooling layer PL[m] that are output when a reference image is input to the neural network NNa, for example.

The determination portion 24 has a function of performing clustering on the coordinates obtained by the comparison portion 23. The determination portion 24 has a function of performing determination on the basis of a clustering result. For example, the determination portion 24 has a function of determining whether a person included in an image obtained by the imaging portion 11 feels fatigue, stress, or the like. A clustering method and a method for determining whether a person feels fatigue or the like are described in detail later.

The processing portion 20 can perform processing using a CPU (Central Processing Unit), a GPU (Graphics Processing Unit), and the like. For example, the image calculation portion 21, the comparison portion 23, and the determination portion 24 can perform processing using a CPU. Since the age estimation portion 22 is formed using the neural network NN, a GPU is preferably used for high-speed processing.

The output portion 13 has a function of outputting a determination result of the determination portion 24. The output portion 13 can include a display portion, for example, and display the determination result of fatigue, stress, or the like on the display portion. The output portion 13 can include a speaker, for example, and beep when a person is determined to feel fatigue, stress, or the like.

<Example of Data Processing Method>

An example of a data processing method using the data processing system 10 is described below. Specifically, an example of a method for determining whether a person feels fatigue using the data processing system 10 is described.

Figure 3:
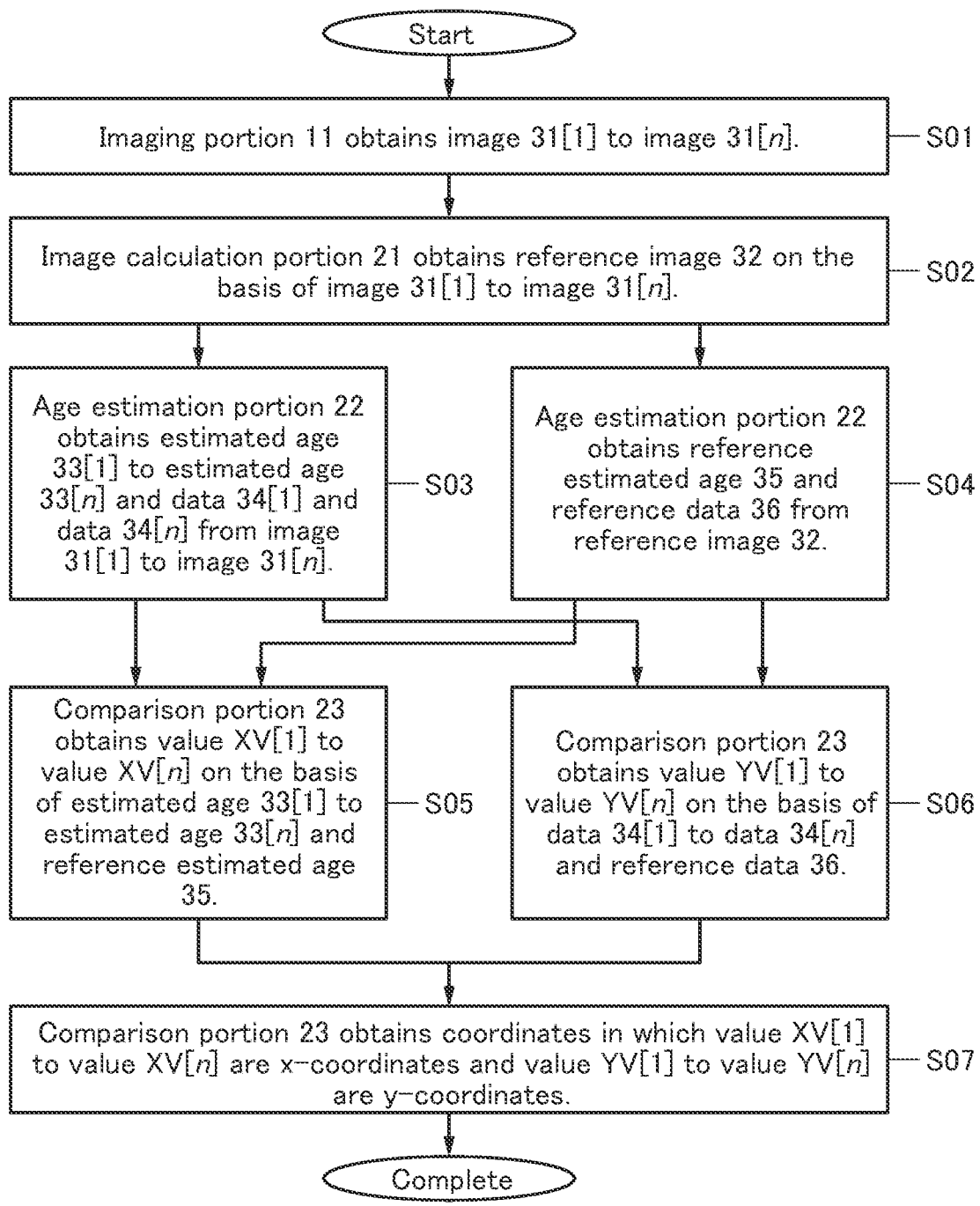
FIG. 3 is a flow chart showing an example of a data processing method.
Figure 4A:
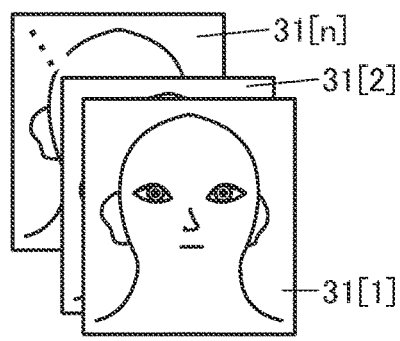
FIG. 4A and FIG. 4B are schematic diagrams showing an example of a data processing method.

FIG. 3 is a flow chart showing an example of a method in which the data processing system 10 can have a function of determining whether a person feels fatigue. First, the imaging portion 11 obtains an image 31[1] to an image 31[n] (n is an integer greater than or equal to 2) (Step S01). The image 31[1] to the image 31[n] are images including the same person. For example, the image 31[1] to the image 31[n] are images including a face of the same person as shown in FIG. 4A. The person included in the image 31[1] to the image 31[n] can be a user of the data processing system 10, for example.

The person included in the image 31[1] to the image 31[n] is in a fatigue-free state, for example. For example, the imaging portion 11 obtains the image 31[1] to the image 31[n] when the user of the data processing system 10 does not feel fatigue.

The image 31[1] to the image 31[n] are obtained within a certain period. For example, the image 31[1] to the image 31[n] are preferably obtained within one month, three months, sixth months, or one year. For example, in the case where one image 31 is obtained each day from January 1st to January 31st, n is 31. For another example, in the case where ten images 31 are obtained each month for sixth months, n is 60.

Figure 4B:
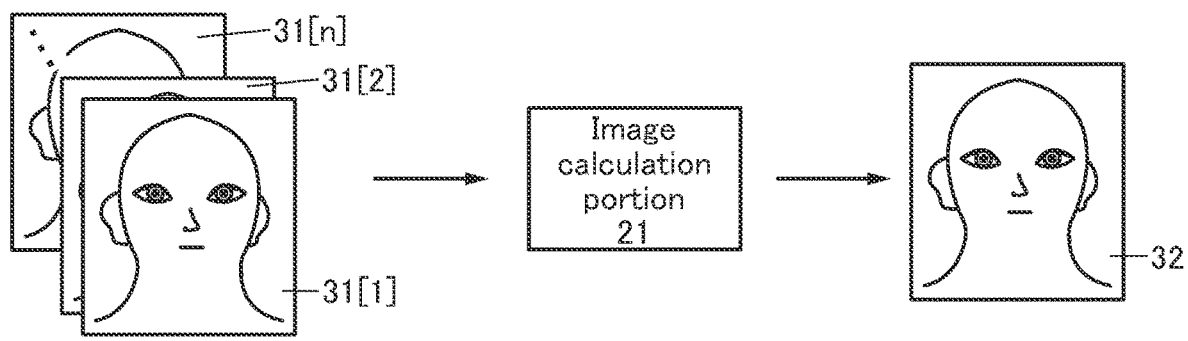

Next, the image calculation portion 21 obtains a reference image 32 on the basis of the image 31[1] to the image 31[n] (Step S02). FIG. 4B is a schematic diagram showing an example of the operation in Step S02. For example, the reference image 32 is obtained by calculating the average of the image 31[1] to the image 31[n]. For example, in the case where a face is included in each of the image 31[1] to the image 31[n], first, n face images are obtained by extracting the face from each of the image 31[1] to the image 31[n]. Next, the definitions of the n face images are adjusted, and then an average image of the n face images is obtained. The average image can be the reference image 32.

Figure 5A:
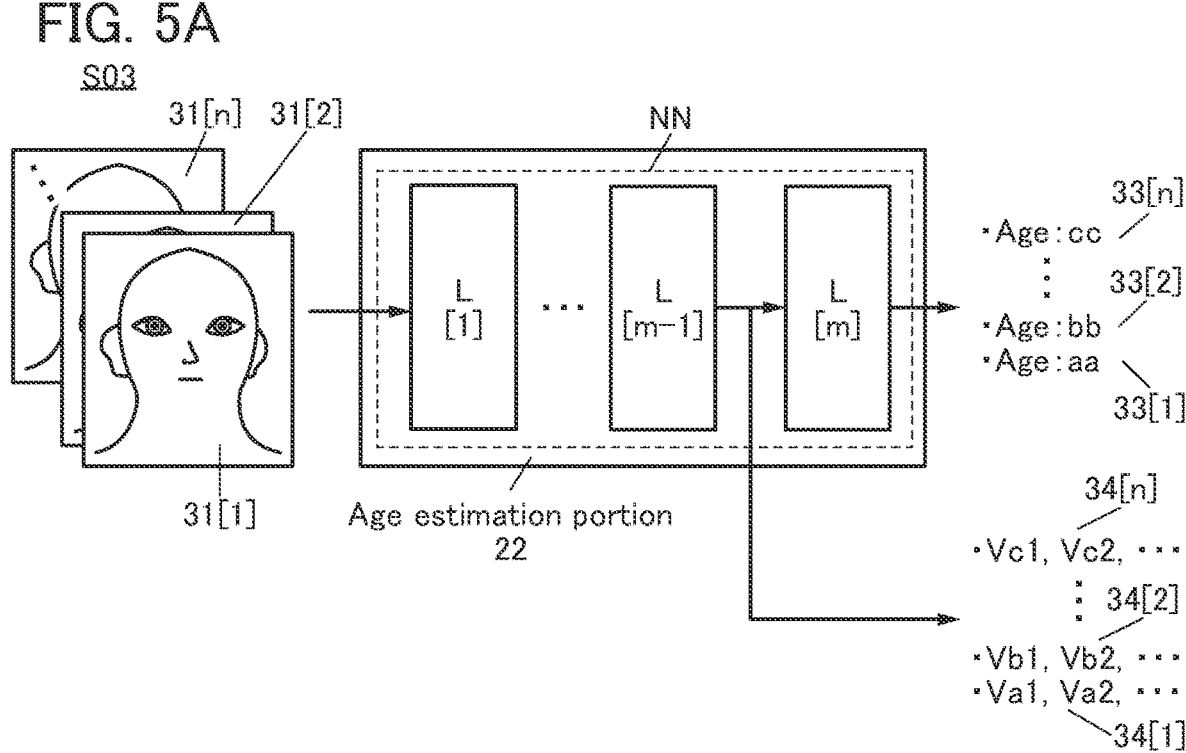
FIG. 5A and FIG. 5B are schematic diagrams showing an example of a data processing method.

After that, the image 31[1] to the image 31[n] are input to the age estimation portion 22 (Step S03). FIG. 5A is a schematic diagram showing an example of the operation in Step S03. In FIG. 5A, the age estimation portion 22 has a function of performing processing by the neural network NN having the structure shown in FIG. 2A. Note that in the following diagrams, the age estimation portion 22 has a function of performing processing by the neural network NN having the structure shown in FIG. 2A.

As shown in FIG. 5A, the image 31[1] to the image 31[n] are input to the layer L[1] functioning as the input layer. Thus, an estimated age 33[1] to an estimated age 33[n] are output from the layer L[m] functioning as the output layer. For example, in the case where the image 31[$i$] ($i$ is an integer greater than or equal to 1 and less than or equal to n) is input to the layer L[1], the estimated age 33[$i$] is output from the layer L[m]. In FIG. 5A, the estimated age 33[1] is aa, the estimated age 33[2] is bb, and the estimated age 33[n] is cc. Furthermore, data is output from the intermediate layer. The data can represent the feature value of the image 31 input to the layer L[1], for example. In FIG. 5A, data output from the layer L[m−1] when the image 31[$i$] is input to the layer L[1] is data 34[$i$].

Data 34[1] to data 34[n] can be vectors, for example. FIG. 5A shows components of the data 34[1] to the data 34[n] that are vectors. In FIG. 5A, Va1, Va2, and the like are included as the components of the data 34[1], Vb1, Vb2, and the like are included as the components of the data 34[2], and Vc1, Vc2, and the like are included as the components of the data 34[n].

Figure 5B:
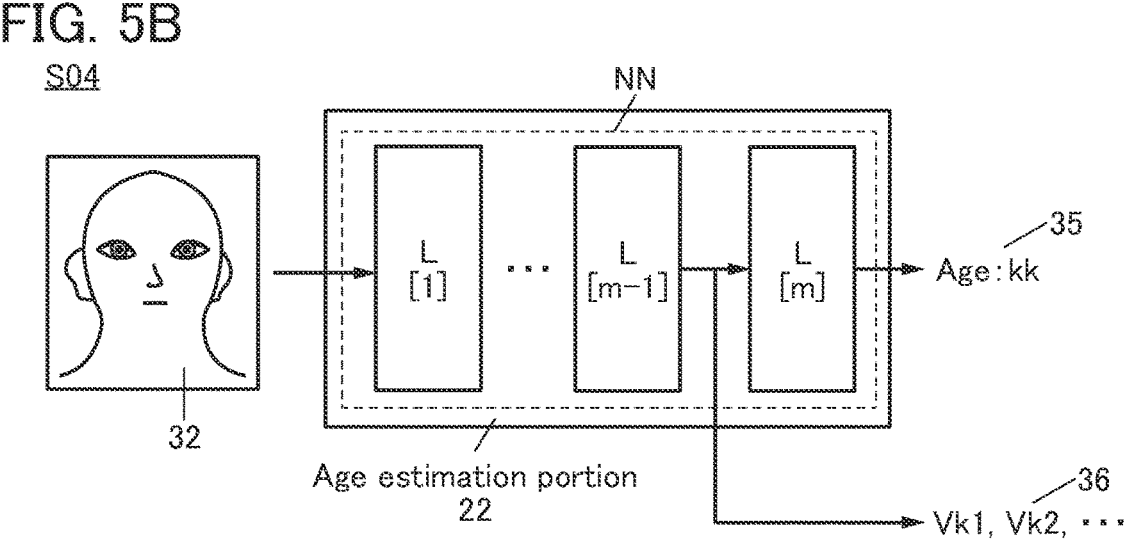

The reference image 32 is input to the age estimation portion 22 (Step S04). FIG. 5B is a schematic diagram showing an example of the operation in Step S04. As shown in FIG. 5B, the reference image 32 is input to the layer L[1] functioning as the input layer. Thus, a reference estimated age 35 is output from the layer L[m] functioning as the output layer. In FIG. 5B, the estimated age 35 is kk. Furthermore, data is output from the intermediate layer. The data can represent the feature value of the reference image 32 input to the layer L[1], for example. In FIG. 5B, data output from the layer L[m−1] when the reference image 32 is input to the layer L[1] is reference data 36. The reference data 36 can be a vector, for example. FIG. 5B shows components of the reference data 36 that is a vector. In FIG. 5B, Vk1, Vk2, and the like are included as the components of the reference data 36.

In this specification and the like, an estimated age output from the age estimation portion 22 when the reference image is input to the age estimation portion 22 is referred to as a reference estimated age. Furthermore, data output from the intermediate layer when the reference image is input to the age estimation portion 22 is referred to as reference data.

The reference data 36 can be a vector, for example. FIG. 5B shows the components of the reference data 36.

After Step S03 and Step S04 are completed, the comparison portion 23 obtains a value XV[1] to a value XV[n] on the basis of the estimated age 33[1] to the estimated age 33[n] and the reference estimated age 35 (Step S05). Specifically, the value XV[i] is obtained on the basis of the estimated age 33[i] and the reference estimated age 35. For example, a difference between the estimated age 33[i] and the reference estimated age 35 can be the value XV[i].

Furthermore, the comparison portion 23 obtains a value YV[1] to a value YV[n] on the basis of the data 34[1] to the data 34[n] and the reference data 36 (Step S06). Specifically, the value YV[i] is obtained on the basis of the data 34[i] and the reference data 36. For example, the degree of similarity between the data 34[i] and the reference data 36 that are vectors can be the value YV[i]. The degree of similarity can be calculated by using cosine similarity, covariance, unbiased covariance, Pearson's correlation coefficient, or the like. In particular, cosine similarity is preferably used.

Figure 6:
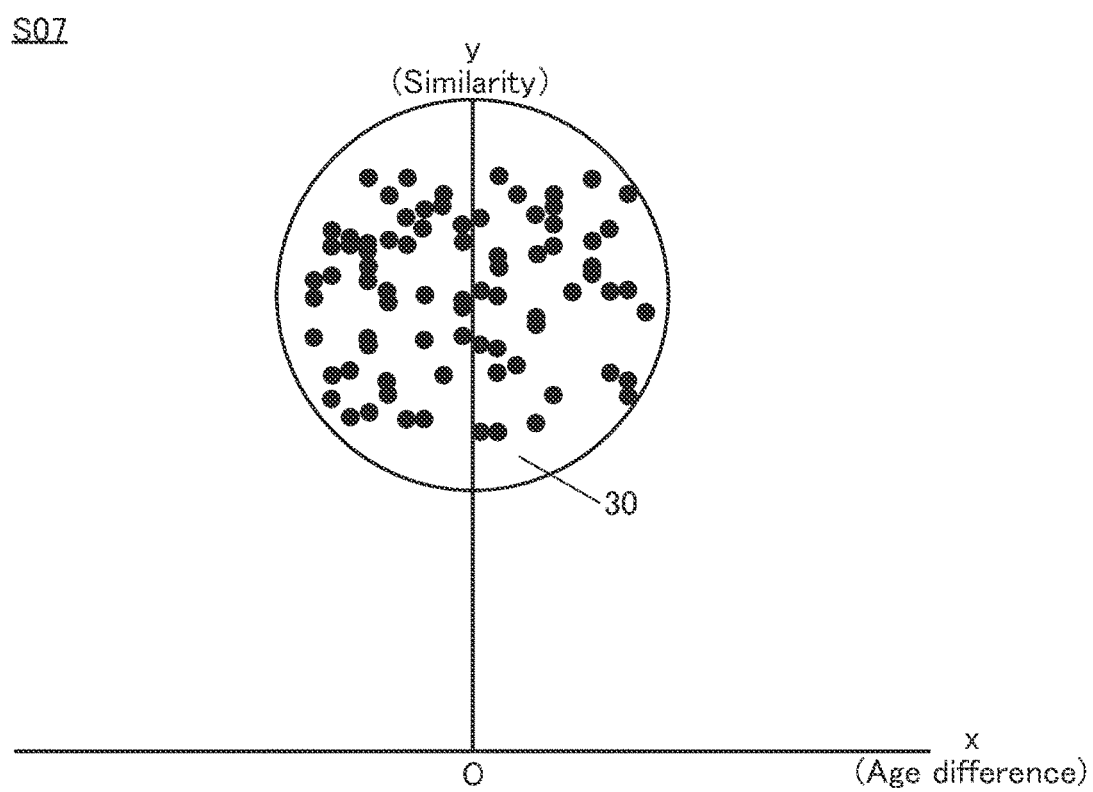
FIG. 6 is a graph showing an example of a data processing method.

After Step S05 and Step S06 are completed, the comparison portion 23 obtains coordinates in which the value XV[1] to the value XV[n] are x-coordinates and the value YV[1] to the value YV[n] are y-coordinates (Step S07). Specifically, the comparison portion 23 obtains coordinates (XV[i], YV[i]) in which the value XV[i] is the x-coordinate and the value YV[i] is the y-coordinate. Here, the coordinates (XV[i], YV[i]) are referred to as i-th coordinates. FIG. 6 shows an xy coordinate system. Coordinates are plotted in the coordinate system shown in FIG. 6. Note that a similar notation is used in a coordinate system shown in another diagram. In FIG. 6, first to n-th coordinates are shown. That is, n coordinates are shown (plotted).

After the comparison portion 23 obtains the first to n-th coordinates, for example, the determination portion 24 performs clustering on the first to n-th coordinates. For example, one cluster is formed on the basis of the first to n-th coordinates. A region including the cluster is a region 30. Clustering can be performed by a local outlier factor (LOF) method, for example. In the case where clustering is performed by LOF, coordinates outside the region 30 can be regarded outliers.

Figure 7:
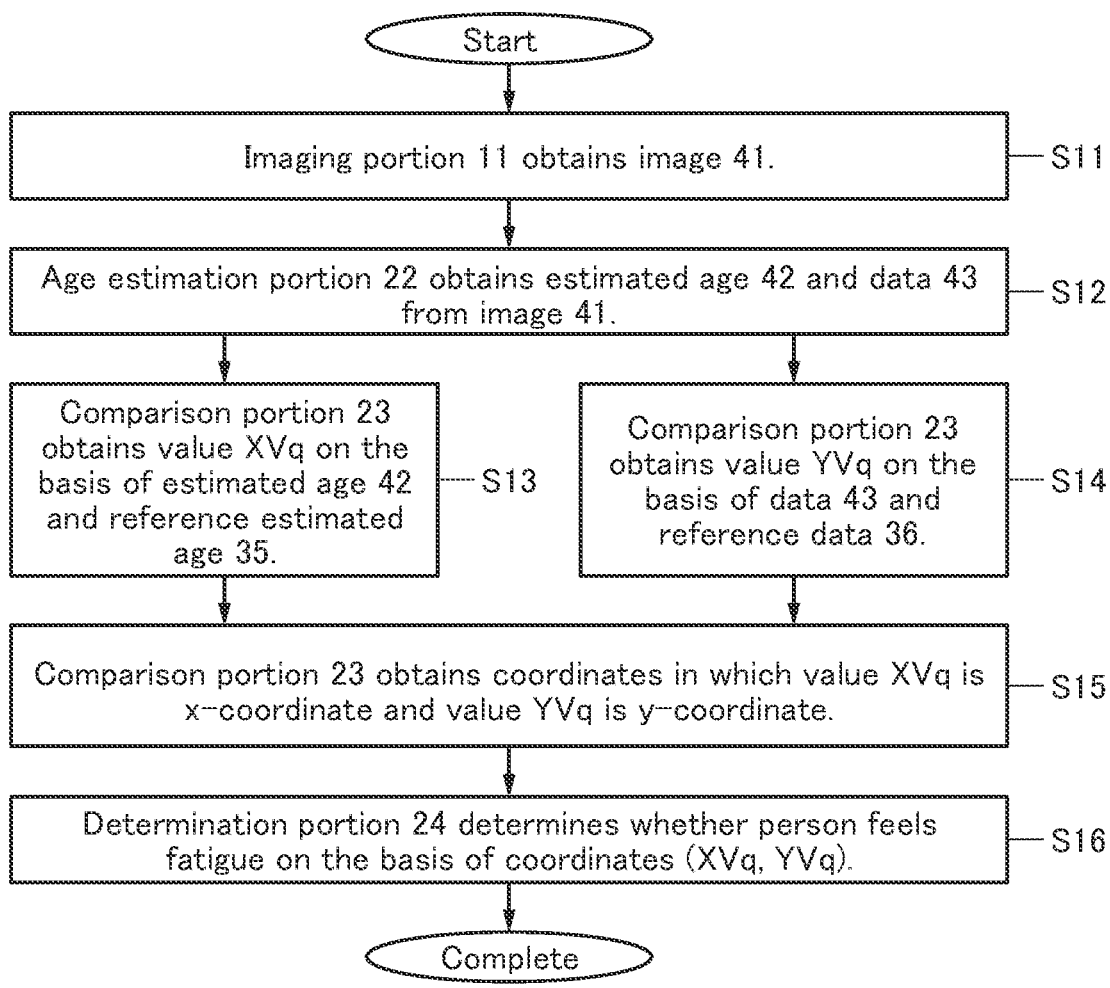
FIG. 7 is a flow chart showing an example of a data processing method.

FIG. 7 is a flow chart showing an example of a method for determining whether a person feels fatigue with the use of the data processing system 10 that has performed the processing shown in FIG. 3 to FIG. 6. First, the imaging portion 11 obtains an image 41 (Step S11). The image 41 is an image including the same person included in the image 31[1] to the image 31[n]. For example, in the case where the image 31[1] to the image 31[n] each include a face, the image 41 is an image including the face of the same person.

In this specification and the like, the image 41 is referred to as a query image in some cases. In the case where the image 31[1] to the image 31[n] are referred to as first to n-th images, the image 41 may be referred to as an n+1-th image.

Figure 8:
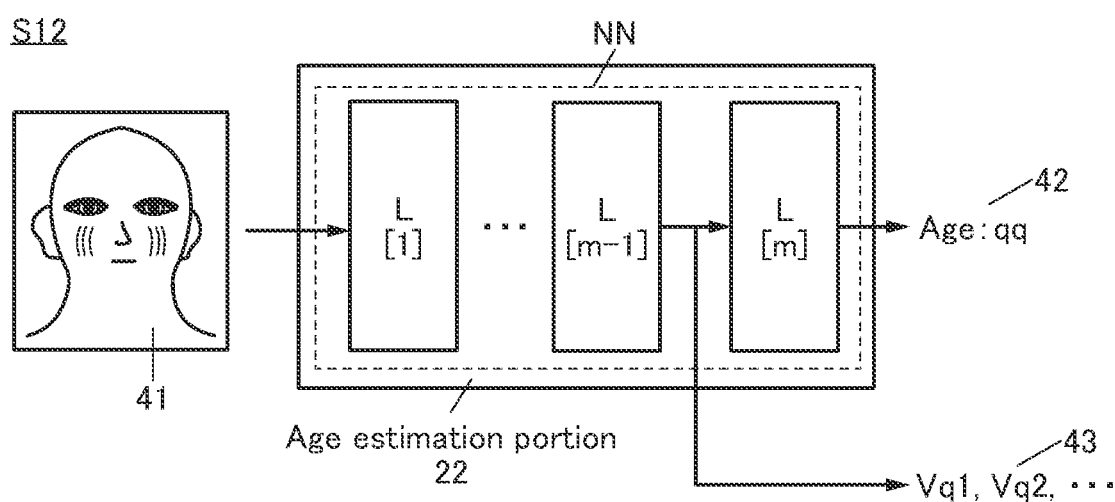
FIG. 8 is a schematic diagram showing an example of a data processing method.

Next, the image 41 is input to the age estimation portion 22 (Step S12). FIG. 8 is a schematic diagram showing an example of the operation in Step S12. As shown in FIG. 8, the image 41 is input to the layer L[1] functioning as the input layer. Thus, an estimated age 42 is output from the layer L[m] functioning as the output layer. In FIG. 8, the estimated age 42 is qq. Furthermore, data is output from the intermediate layer. In FIG. 8, data output from the layer L[m−1] when the image 41 is input to the layer L[1] is data 43. The data 43 can be a vector, for example. FIG. 8 shows components of the data 43 that is a vector. In FIG. 8, Vq1, Vq2, and the like are included as the components of the reference data 36.

The data 43 can be a vector, for example. FIG. 8 shows the components of the data 43.

For example, in the case where the image 41 includes a face, the face is extracted from the image 41 to obtain a face image, the definition of the face image is adjusted to the definitions of the face images obtained from the image 31[1] to the image 31[n], and then the face image can be input to the age estimation portion 22. This processing can be performed by the image calculation portion 21, for example.

In this specification and the like, for example, in the case where the image 41 is referred to as the n+1-th image, the estimated age 42 may be referred to as an n+1-th estimated age and the data 43 may be referred to as n+1-th data. In the case where the image 41 is referred to as the query image, the estimated age 42 may be referred to as a query estimated age and the data 43 may be referred to as query data.

After that, the comparison portion 23 obtains a value XVq on the basis of the estimated age 42 and the reference estimated age 35 (Step S13). Specifically, the value XVq is obtained by a method similar to the method used for obtaining the value XV[1] to the value XV[n]. For example, when a difference between the estimated age 33[i] and the reference estimated age 35 is the value XV[i], a difference between the estimated age 42 and the reference estimated age 35 is the value XVq. In the case where the image 41 is obtained after a long period from the time of obtaining the image 31[1] to the image 31[n], for example, the value XVq may be obtained on the basis of the reference estimated age 35 and a value obtained by subtracting the period from the estimated age 42. For example, in the case where the image 31[n] is the image obtained last of the image 31[1] to the image 31[n] and the image 41 is obtained after one year from the time of obtaining the image 31[n], a value obtained by subtracting one year from a difference between the estimated age 42 and the reference estimated age 35 can be the value XVq. Thus, even in the case where the image 41 is obtained after a long period from the time of obtaining the image 31[1] to the image 31[n], whether a person feels fatigue or the like can be determined with high accuracy.

The comparison portion 23 obtains a value YVq on the basis of the data 43 and the reference data 36 (Step S14). Specifically, the value YVq is obtained by a method similar to the method used for obtaining the value YV[1] to the value YV[n]. For example, when the cosine similarity between the data 34[i] and the reference data 36 is the value YV[i], the cosine similarity between the data 43 and the reference data 36 is the value YVq.

After Step S13 and Step S14 are completed, the comparison portion 23 obtains coordinates in which the value XVq is an x-coordinate and the value YVq is a y-coordinate (Step S15). FIG. 9A to FIG. 9C each show the coordinates (XVq, YVq). Here, the coordinates shown in FIG. 6 are also shown in FIG. 9. When the image 41 is referred to as the n+1-th image, the coordinates (XVq, YVq) are referred to as n+1-th coordinates in some cases. When the image 41 is referred to as the query image, the coordinates (XVq, YVq) are referred to as query coordinates in some cases.

Next, the determination portion 24 determines whether the person included in the image 41 feels fatigue on the basis of the coordinates (XVq, YVq) and the coordinates (XV[1], YV[1]) to the coordinates (XV[n], YV[n]) (Step S16). For example, in the case where a face is included in the image 41, whether a person of the face feels fatigue is determined. Specifically, the person is determined to feel fatigue when the coordinates (XVq, YVq) are included in a region 50 shown in FIG. 9A to FIG. 9C and the like, and the person is determined to feel no fatigue when the coordinates (XVq, YVq) are not included in the region 50.

The region 50 is described below. As described above, the person included in the image 31[1] to the image 31[n] is assumed to be in a fatigue-free state. Thus, in the case where the coordinates (XVq, YVq) are included in the region 30 formed using LOF or the like on the basis of the coordinates (XV[1], YV[1]) to the coordinates (XV[n], YV[n]), the person included in the image 41 can be determined to feel no fatigue. A person feeling fatigue tends to look older than the person feeling no fatigue because of increased wrinkles, skin sagging, and the like of the face or the like. In other words, it can be said that a person feeling fatigue has more features that make the age estimation portion 22 estimate the age to be higher than the same person feeling no fatigue and having the same age. Accordingly, in the case where the value XVq obtained from the image 41 is a difference between the estimated age 42 obtained from the image 41 and the reference estimated age 35 obtained from the reference image 32, the person included in the image 41 can be determined to feel no fatigue if the value XVq is a negative value. Thus, as shown in FIG. 9A to FIG. 9C, the region 50 can be a region that is not included in the region 30 and has the coordinate XVq of being 0 or more.

FIG. 9A shows the case where the coordinates (XVq, YVq) are included in the region 50. In this case, the person included in the image 41 can be determined to feel fatigue. FIG. 9B shows the case where the coordinates (XVq, YVq) are included in the region 30. In this case, the person included in the image 41 can be determined to feel no fatigue. FIG. 9C shows the case where the coordinates (XVq, YVq) are included in neither the region 30 nor the region 50. Even in this case, the person included in the image 41 can be determined to feel no fatigue as in the case shown in FIG. 9B.

Although the region that is not included in the region 30 and has the coordinate XVq of being 0 or more is the region 50 in FIG. 9A to FIG. 9C, for example, the range of the region 50 is not limited thereto. FIG. 9D1 and FIG. 9D2 are diagrams in each of which the region 50 is added to the xy coordinate system shown in FIG. 6, and the range of the region 50 is different from that shown in FIG. 9A to FIG. 9C. Note that the coordinates (XVq, YVq) are not shown in FIG. 9D1 or FIG. 9D2.

In FIG. 9D1, the region 50 is a region that has the x-coordinate greater than or equal to the greatest x-coordinate of the x-coordinates at the boundary of the region 30. Note that the coordinates included in the region 50 may have any y-coordinate as long as the x-coordinate is greater than or equal to the greatest x-coordinate of the x-coordinates at the boundary of the region 30.

Although the region 50 is rectangular in FIG. 9D1, one embodiment of the present invention is not limited thereto. In FIG. 9D2, the greater the x-coordinate is, the wider the range of the y-coordinate included in the region 50 is. Specifically, as the x-coordinate is greater, the greater y-coordinate is included in the region 50. FIG. 9D2 shows an example in which the region 50 is a trapezoid having an upper side and a lower side which are parallel to the x-axis and having one leg in contact with the boundary of the region 30. Note that the region 50 may be a right-angled triangle having a leg in contact with the boundary of the region 30, for example.

In the case of FIG. 9A to FIG. 9C, FIG. 9D1, and FIG. 9D2, the region 50 is defined on the basis of the region 30 and the magnitude of the x-coordinate. As described above, the x-coordinate can be the difference between the estimated age and the reference estimated age, for example. Therefore, the image 31[1] to the image 31[n] used for forming the region 30 are preferably obtained within one year. For example, when, among the image 31[1] to the image 31[n], the image 31[1] is an image obtained in the earliest period and the image 31[n] is an image obtained in the latest period, the image 31[n] is preferably obtained within one year from the time of obtaining the image 31[1].

The above is an example of the method for determining whether a person feels fatigue with the data processing system 10. Note that whether the user or the like of the data processing system 10 feels stress or the like can be determined by a method similar to the method shown in FIG. 3 to FIG. 9.

By the data processing method using the data processing system 10, whether the user of the data processing system 10 feels fatigue or the like can be determined without attaching part of the user's body to the electronic device incorporating the data processing system 10 for a certain period. Thus, the data processing system 10 can be said to be highly convenient. Specifically, the electronic device incorporating the data processing system 10 can be said to be highly convenient. Moreover, when the imaging portion 11 performs imaging to obtain an image including a face or the like, the data processing system 10 can determine whether a person feels fatigue or the like. Thus, the data processing system 10 can determine whether a person feels fatigue or the like in a short time.

By the data processing method using the data processing system 10, whether a person feels fatigue or the like can be determined using a neural network. Thus, the data processing system 10 can determine whether a person feels fatigue or the like with high accuracy.

In a possible method for determining whether a person feels fatigue or the like using a neural network, an image including a face or the like is input to the neural network and an output layer of the neural network directly outputs a result of estimating whether a person feels fatigue or the like. However, in this method, both an image of a person feeling no fatigue or the like and an image of the person feeling fatigue or the like need to be prepared as learning data. In contrast, in the data processing method of one embodiment of the present invention, all of the image 31[1] to the image 31[n] that are used to make the data processing system 10 have a function of determining whether a person feels fatigue or the like can be images of a person feeling no fatigue. Thus, the data processing system 10 can determine whether a person feels fatigue or the like by a simple method with a neural network.

In the data processing method using the data processing system 10, for example, whether a person included in the image 41 feels fatigue or the like is determined using the difference between the person's estimated age 42 and the reference estimated age 35. Thus, the estimated age 42 itself is not used for the determination. Accordingly, the accuracy in estimating one's age by the neural network NN does not necessarily need to be high. Thus, for example, the weight or the like of the neural network NN does not need to be customized to a person whose fatigue level or the like is to be determined. Accordingly, learning data does not need to be prepared for each person to be subjected to determination of the fatigue level or the like. Thus, the data processing system 10 can determine whether a person feels fatigue or the like by a simple method with a neural network.

At least part of this embodiment can be implemented in combination with the other embodiment described in this specification as appropriate.

Embodiment 2

In this embodiment, examples of electronic devices in which the data processing system and the data processing method of embodiments of the present invention can be used are described with reference to drawings.

Examples of the electronic devices in which the data processing system and the data processing method of embodiments of the invention can be used include display devices, smartphones, tablets, personal computers, image memory devices or image reproducing devices provided with storage media, mobile phones, game consoles including portable game consoles, portable data terminals, e-book readers, cameras such as video cameras and digital still cameras, and goggle-type displays (head-mounted displays). Specific examples of these electronic devices are illustrated in FIG. 10A to FIG. 10D.

Figure 10A:
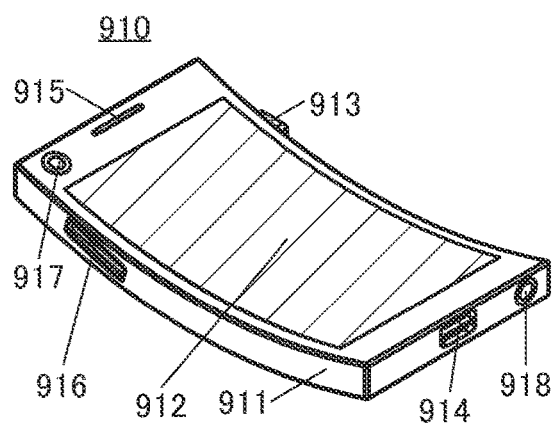
FIG. 10A to FIG. 10D are diagrams showing examples of an electronic device.

FIG. 10A illustrates an example of a mobile phone 910, which can be a smartphone, for example. The mobile phone 910 includes a housing 911, a display portion 912, an operation button 913, an external connection port 914, a speaker 915, a jack 916, a camera 917, an earphone jack 918, and the like. In the mobile phone 910, the display portion 912 can be provided with a touch sensor. All operations including making a call and inputting text can be performed by touching the display portion 912 with a finger, a stylus, or the like. In addition, a variety of removable memory devices such as a memory card, for example, an SD card, a USB memory, and an SSD (Solid State Drive), can be inserted in the jack 916.

With the use of the data processing system and the data processing method of embodiments of the present invention in the mobile phone 910, the mobile phone 910 can determine whether a user or the like feels fatigue, stress, or the like in a highly convenient manner in a short time. Note that in the case where the data processing system 10 is used in the mobile phone 910, the camera 917 can be included in the imaging portion 11 illustrated in FIG. 1. Furthermore, the display portion 912, the speaker 915, or the like can be included in the output portion 13 illustrated in FIG. 1.

Figure 10B:
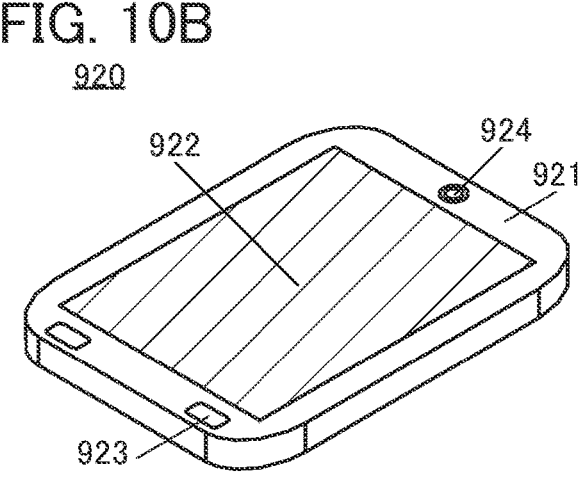

FIG. 10B illustrates an example of a portable data terminal 920, which can be a tablet, for example. The portable data terminal 920 includes a housing 921, a display portion 922, a speaker 923, a camera 924, and the like. A touch panel function of the display portion 922 enables input and output of data. Furthermore, a character or the like in an image that is captured by the camera 924 can be recognized and the character can be voice-output from the speaker 923.

With the use of the data processing system and the data processing method of embodiments of the present invention in the portable data terminal 920, the portable data terminal 920 can determine whether a user or the like feels fatigue, stress, or the like in a highly convenient manner in a short time. Note that in the case where the data processing system 10 is used in the portable data terminal 920, the camera 924 can be included in the imaging portion 11 illustrated in FIG. 1. Furthermore, the display portion 922, the speaker 923, or the like can be included in the output portion 13 illustrated in FIG. 1.

Figure 10C:
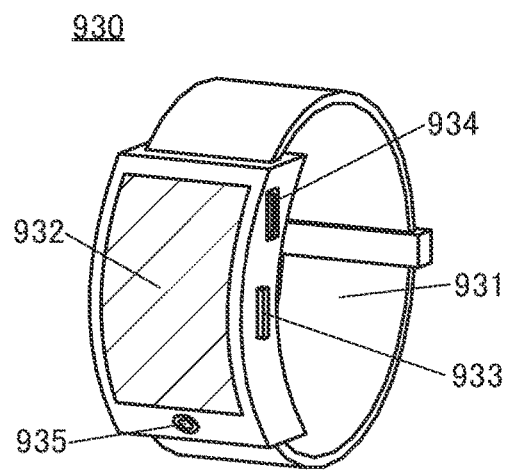

FIG. 10C is an example of a wristwatch-type information terminal 930, which includes a housing and wristband 931, a display portion 932, an operation button 933, an external connection port 934, a camera 935, and the like. The display portion 932 is provided with a touch panel for operating the information terminal 930. The housing and wristband 931 and the display portion 932 have flexibility and fit a body well.

With the use of the data processing system and the data processing method of embodiments of the present invention in the information terminal 930, the information terminal 930 can determine whether a user or the like feels fatigue, stress, or the like in a highly convenient manner in a short time. Note that in the case where the data processing system 10 is used in the information terminal 930, the camera 935 can be included in the imaging portion 11 illustrated in FIG. 1. Furthermore, the display portion 932 or the like can be included in the output portion 13 illustrated in FIG. 1.

Figure 10D:
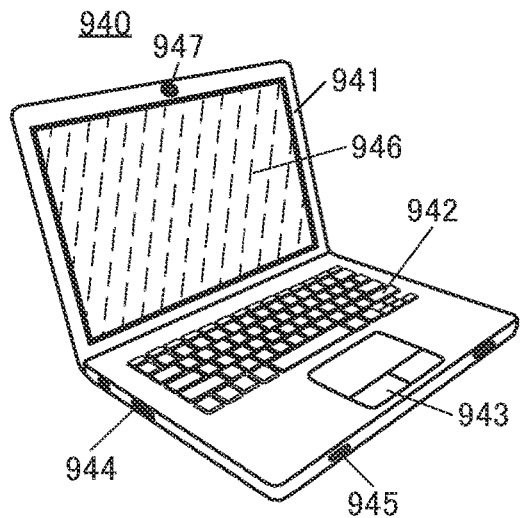

FIG. 10D illustrates a laptop personal computer 940. The laptop personal computer 940 includes a housing 941, a keyboard 942, a pointing device 943, an external connection port 944, a speaker 945, and the like. The display portion 946 and the camera 947 are incorporated in the housing 941.

With the use of the data processing system and the data processing method of embodiments of the present invention in the laptop personal computer 940, the laptop personal computer 940 can determine whether a user or the like feels fatigue, stress, or the like in a highly convenient manner in a short time. Note that in the case where the data processing system 10 is used in the laptop personal computer 940, the camera 947 can be included in the imaging portion 11 illustrated in FIG. 1. Furthermore, the display portion 946 or the like can be included in the output portion 13 illustrated in FIG. 1.

The electronic devices of this embodiment each include a display portion; however, one embodiment of the present invention can also be used in an electronic device without a display portion.

At least part of this embodiment can be implemented in combination with the other embodiment described in this specification as appropriate.

REFERENCE NUMERALS

10: data processing system, 11: imaging portion, 12: memory portion, 13: output portion, 20: processing portion, 21: image calculation portion, 22: age estimation portion, 23: comparison portion, 24: determination portion, 30: region, 31: image, 32: reference image, 33: estimated age, 34: data, 35: reference estimated age, 36: reference data, 41: image, 42: estimated age, 43: data, 50: region, 910: mobile phone, 911: housing, 912: display portion, 913: operation button, 914: external connection port, 915: speaker, 916: jack, 917: camera, 918: earphone jack, 920: portable data terminal, 921: housing, 922: display portion, 923: speaker, 924: camera, 930: information terminal, 931: housing and wristband, 932: display portion, 933: operation button, 934: external connection port, 935: camera, 940: laptop personal computer, 941: housing, 942: keyboard, 943: pointing device, 944: external connection port, 945: speaker, 946: display portion, 947: camera.

The invention claimed is:
1. A data processing system comprising:
an imaging portion;
a first processing portion;
a second processing portion;
a third processing portion; and
a fourth processing portion, wherein the imaging portion is configured to obtain first to n-th images (n is an integer greater than or equal to 2) each comprising an image of a person's face, and a query image, wherein the first processing portion is configured to obtain a reference image on the basis of the first to n-th images, wherein the second processing portion comprises a neural network comprising an input layer, an intermediate layer, and an output layer, wherein the second processing portion is configured to output first to n-th estimated ages or a reference estimated age from the output layer and output first to n-th data or reference data from the intermediate layer in the case where the first to n-th images or the reference image is input to the input layer, wherein the second processing portion is configured to output a query estimated age from the output layer and output query data from the intermediate layer in the case where the query image is input to the input layer, wherein the third processing portion is configured to obtain first to n-th coordinates in each of which an x-coordinate is a value of a difference between the reference estimated age and corresponding one of the first to n-th estimated ages and a y-coordinate is a value of a degree of similarity between the reference data and corresponding one of the first to n-th data, wherein the third processing portion is configured to obtain query coordinates in which an x-coordinate is a value of a difference between the query estimated age and the reference estimated age and a y-coordinate is a value of a degree of similarity between the query data and the reference data, and wherein the fourth processing portion is configured to perform clustering on the basis of the first to n-th coordinates and determine whether the person included in the query image feels fatigue on the basis of a result of the clustering and the query coordinates.

2. A data processing method, comprising the steps of:

obtaining first to n-th images (n is an integer greater than or equal to 2) each comprising an image of a person's face;

obtaining a reference image on the basis of the first to n-th images;

inputting the first to n-th images and the reference image to an input layer of a neural network comprising the input layer, an intermediate layer, and an output layer to output first to n-th estimated ages and a reference estimated age from the output layer and first to n-th data and reference data from the intermediate layer;

obtaining first to n-th coordinates in each of which an x-coordinate is a difference between the reference estimated age and corresponding one of the first to n-th estimated ages and a y-coordinate is a value of a degree of similarity between the reference data and corresponding one of the first to n-th data;

obtaining a query image comprising an image of the person's face;

inputting the query image to the input layer to output a query estimated age from the output layer and query data from the intermediate layer;

obtaining query coordinates in which an x-coordinate is a value of a difference between the query estimated age and the reference estimated age and a y-coordinate is a value of a degree of similarity between the query data and the reference data; and performing clustering on the basis of the first to n-th coordinates and determining whether the person included in the query image feels fatigue on the basis of a result of the clustering and the query coordinates.

3. An electronic device comprising:

an imaging portion;

a first processing portion;

a second processing portion;

a third processing portion; and a fourth processing portion, wherein the imaging portion is configured to obtain first to n+1-th images (n is an integer greater than or equal to 2) each comprising an image of a person's face, wherein the first processing portion is configured to obtain a reference image on the basis of the first to n-th images, wherein the second processing portion comprises a neural network comprising an input layer, an intermediate layer, and an output layer, wherein the second processing portion is configured to output first to n-th estimated ages from the output layer and output first to n-th data from the intermediate layer in the case where the first to n-th images are input to the input layer, wherein the second processing portion is configured to output a reference estimated age from the output layer and output reference data from the intermediate layer in the case where the reference image is input to the input layer, wherein the second processing portion is configured to output an n+1-th estimated age from the output layer and output n+1-th data from the intermediate layer in the case where the n+1-th image is input to the input layer, wherein the third processing portion is configured to obtain first to n-th coordinates in each of which an x-coordinate is a value of a difference between the reference estimated age and corresponding one of the first to n-th estimated ages and a y-coordinate is a value of a degree of similarity between the reference data and corresponding one of the first to n-th data, wherein the third processing portion is configured to obtain n+1-th coordinates in which an x-coordinate is a value of a difference between the n+1-th estimated age and the reference estimated age and a y-coordinate is a value of a degree of similarity between the n+1-th data and the reference data, and wherein the fourth processing portion is configured to perform clustering on the basis of the first to n-th coordinates and determine whether the person included in the n+1-th image feels fatigue on the basis of a result of the clustering and the n+1-th coordinates.

* * * * *